United States Patent [19]

Stamboulian

[11] 4,357,035
[45] Nov. 2, 1982

[54] FLEXIBLE BELT POSITIONING ARM

[75] Inventor: Nazareth Stamboulian, Los Angeles, Calif.

[73] Assignee: American Safety Equipment Corporation, San Fernando, Calif.

[21] Appl. No.: 182,645

[22] Filed: Aug. 29, 1980

[51] Int. Cl.³ .......................................... B60R 21/10
[52] U.S. Cl. .................................. 280/804; 297/469
[58] Field of Search ............... 280/804, 801, 802, 808; 297/469, 475, 481, 483, 486

[56] References Cited

U.S. PATENT DOCUMENTS

| 4,193,613 | 3/1980 | Cachia | 280/804 |
| 4,193,614 | 3/1980 | Felsing | 280/804 |
| 4,218,075 | 8/1980 | Rogers, Jr. | 280/804 |
| 4,274,658 | 6/1981 | Takata | 280/804 |

FOREIGN PATENT DOCUMENTS

| 2161384 | 6/1973 | Fed. Rep. of Germany | 280/804 |
| 55-36121 | 3/1980 | Japan | 280/804 |

Primary Examiner—Joseph F. Peters, Jr.
Assistant Examiner—Ross Weaver
Attorney, Agent, or Firm—Poms, Smith, Lande & Rose

[57] ABSTRACT

An improved three-point passive belt restraint system having a flexible shoulder belt positioning arm. The flexible belt positioning arm is adapted for positioning the shoulder belt adjacent the occupants shoulder when the belt restraint system is in the occupant restraint position. Further, the flexible belt positioning arm is mounted to a sled whereby the sled and positioning arm are moved away from the occupant to an occupant non-restraint position upon door opening.

The flexible belt positioning arm includes an upper tube arm attached to the sled and a lower tube arm which includes a web guide for guiding and positioning the shoulder belt adjacent the occupant's shoulder. The upper and lower tube arms are connected at their inner ends by a flexible connection. The flexible connection allows flexing of the upper and lower tube arms relative each other to prevent occupant injury during crash conditions or inadvertent contact.

13 Claims, 8 Drawing Figures

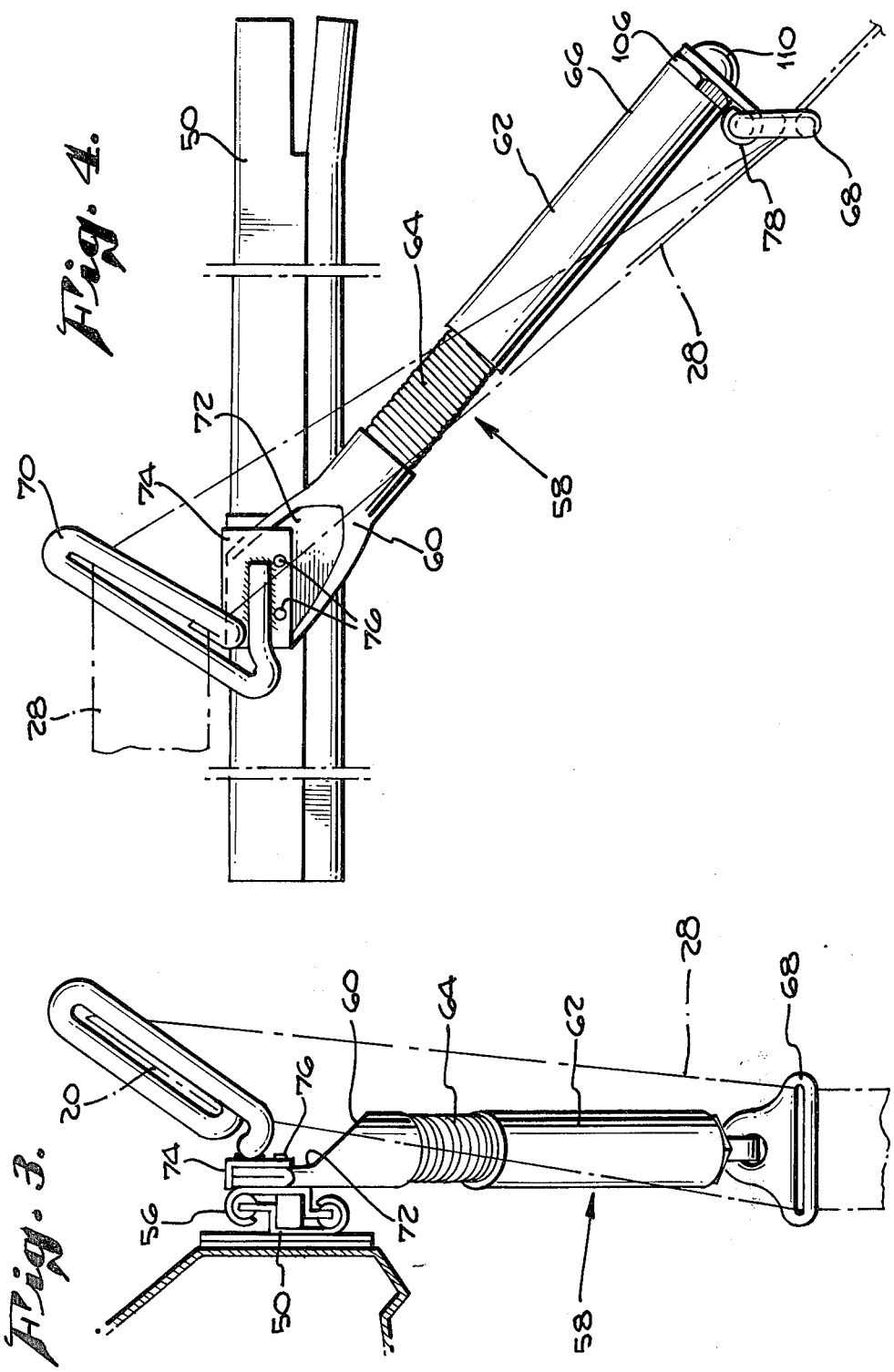

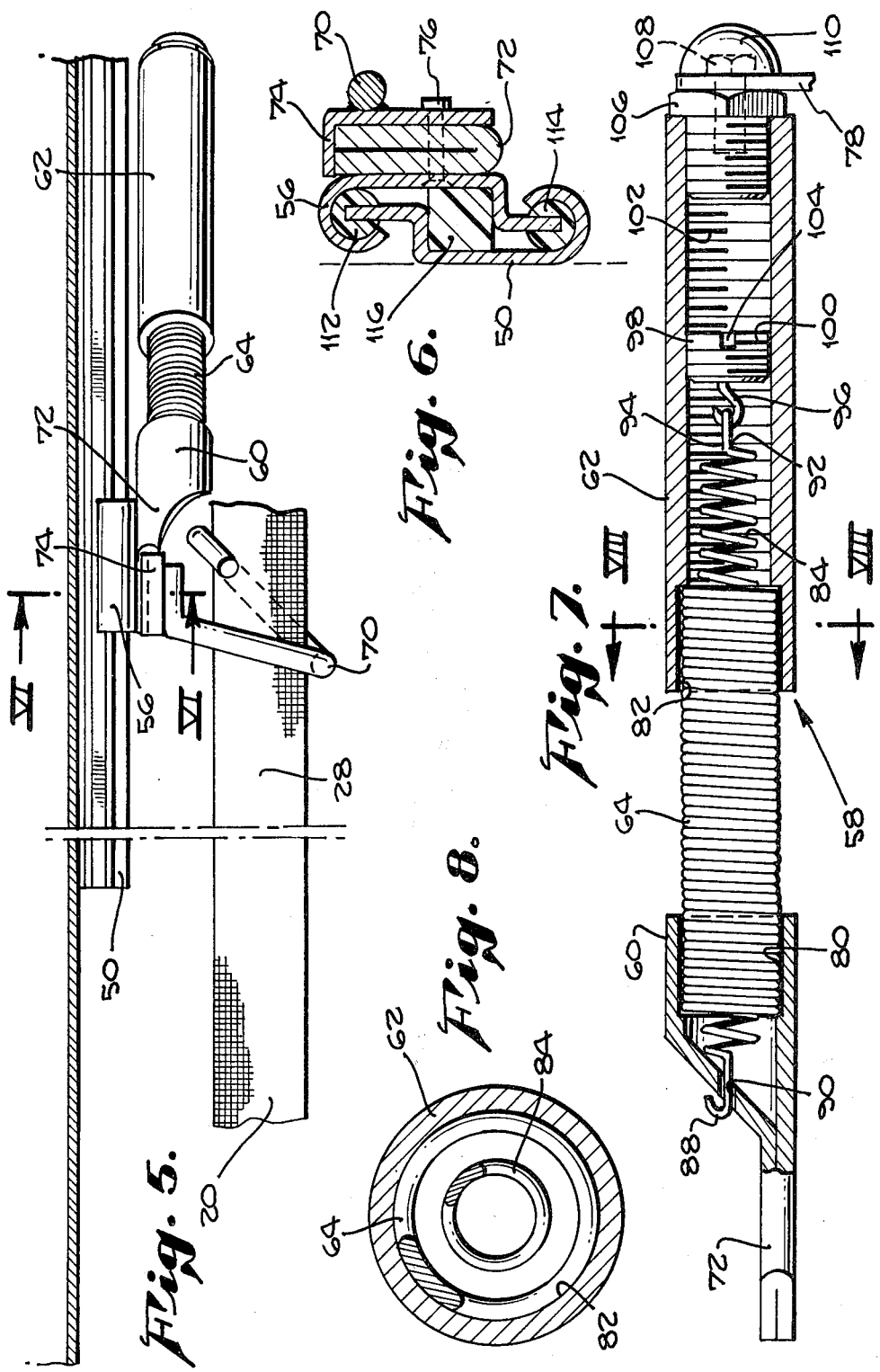

FLEXIBLE BELT POSITIONING ARM

BACKGROUND OF THE INVENTION

In recent years there has been a growing interest in the development of passive three-point belt restraint systems for restraining occupants of vehicles. The three-point passive belt restraint system is desirable since it secures both upper and lower body portions and automatically moves to a occupant non-restraining condition upon suitable actuation.

Typically, the opening of the occupant's door automatically moves the three-point belt restraint system from the occupant thereby allowing entrance and exit of the vehicle. Upon closing the occupant's vehicle door, the belt automatically moves to an occupant restraining position about the occupant.

Numerous different devices and mechanisms have been devised to accomplish the desired automatic or passive operation of the three point belt system between an occupant restraint and an occupant nonrestraint position.

Many of the prior art belt release or removal mechanisms are not only complicated but do not entirely remove the belt from the occupant's path thereby partially obstructing entrance or exit from the vehicle. More recently, three-point passive belt restraint systems have been developed which remove the belts from the occupant's path entirely during exit and entry of the vehicle. Typical of such mechanisms in U.S. Pat. No. 4,193,614 issued to Felsing on Mar. 18, 1980. The Felsing patent discloses a typical three-point belt restraint system. The system includes two lower seat belt segments, one being secured to the interior side of an occupant's seat with the other being secured to the vehicle door. The belt system further includes an upper shoulder segment which is secured by a retractor or the like which is placed to the rear and above the vehicle occupant. To insure that the upper shoulder belt is removed from about the occupant to allow entry and exit from the vehicle, a shoulder belt guide is provided which moves from a restraint position behind the vehicle occupant to a non-restraint position forward in the vehicle where the shoulder belt is lifted up and away from the occupant. Another patent disclosing the use of a shoulder belt guide for removing the shoulder belt upward and away from the occupant passenger is U.S. Pat. No. 4,193,613 issued to Cachia on Mar. 18, 1980. Both Felsing and Cachia disclose the use of a motor or the like to power the shoulder belt guide forward in the vehicle upon door opening or other actuation to pull the belt out of the occupant's way.

Although the belt guide discussed above is suitable for insuring that the shoulder belt segment of the three-point passive system is removed entirely out of the occupant's entry or exit path, the shoulder belt guide does not provide for positioning of the shoulder belt about the occupant. It would therefore be desirable to provide a three-point passive belt restraint system where the shoulder belt guide not only moves the shoulder belt out of the occupant's way for entry and exit, but also positions the shoulder belt appropriately on the occupant's shoulder during driving operations. By positioning the shoulder belt directly on the occupant's shoulder, the possibility of improper upper body restraint due to a poorly positioned shoulder belt is reduced.

SUMMARY OF THE INVENTION

It is therefore an object of the present invention is to disclose and provide an improved three-point passive belt restraint system wherein the shoulder belt is positioned adjacent the occupant's shoulder to provide optimum positioning for restraint during crash conditions.

Another object of the present invention is to disclose and provide a flexible arm for positioning the shoulder belt adjacent the occupant's shoulder whereby the flexibility of the positioning arm prevents injury to vehicle occupants during crash conditions when the occupant might be thrown against the positioning arm and further prevents injury from inadvertent occupant contact with the positioning arm.

A further object of the present invention is to disclose and provide a positioning arm wherein even though the shoulder belt is positioned adjacent the occupants shoulder for optimum restraint protection, the belt can still be moved forward and away from the occupant for occupant exit without the belt hitting the occupant's head or otherwise hindering occupant exit from the vehicle.

The above objects and others are accomplished in accordance with the present invention by the provision of a flexible belt positioning arm which is adapted for use in a three-point passive belt restraint systems. The flexible positioning arm includes an upper tube arm and a lower tube arm. Flexible connection means are provided for flexibly connecting the upper tube arm to the lower tube arm. Further, a lower web guide or positioner is attached to the lower tube arm for guiding the shoulder belt segment passed therethrough and positioning the belt adjacent the occupants shoulder. The upper tube arm is mounted to the vehicle or shoulder belt guide so that when the shoulder belt is moved to the occupant restraint position, the lower web guide places the shoulder belt adjacent the occupant's shoulder.

As a feature of the present invention, a main spring element is provide for flexibly connecting the upper and lower tube arms together. A tension spring may also be provided concentrically within the main spring element. The tension spring is also connected to the upper and lower tube arms with means being provided to adjust the tension in the tension spring whereby the flexibility of the main spring element can be adjusted.

The flexible belt positioning arm of the present invention is intended to replace the shoulder belt guide present in prior art systems. The flexible belt positioning arm serves the same purpose of moving the shoulder belt away from the occupant during exiting or entrance of vehicle; however, when the flexible positioning arm is moved to the occupant restraint position, the shoulder belt is placed adjacent the occupant's shoulder by the web guide or positioner as opposed to prior art guides which do not have this positioning feature.

A more complete understanding of this improvement in three-point passive belt restraint systems, as well as a recognition of additional objects and advantages therefore, will be afforded to those skilled in the art from a consideration of the following detailed description of an exemplary embodiment thereof. Reference will be made to the appended sheets of drawings which will first be discussed briefly.

BRIEF DESCRIPTION OF THE DRAWINGS

FIG. 3 is a rear view of the preferred flexible belt positioning arm of the present invention.

FIG. 4 is a side view of the preferred flexible belt positioning arm of the present invention.

FIG. 5 is a top view of the preferred flexible belt positioning arm of the present invention.

FIG. 6 is a sectional view of FIG. 5 taken in the VI—VI plane.

FIG. 7 is a detailed partial sectional view of the preferred flexible belt positioning arm of the present invention.

FIG. 8 is a sectional view of FIG. 7 taken in the VIII—VIII plane.

DETAILED DESCRIPTION OF THE PREFERRED EXEMPLARY EMBODIMENT

Figure 1:
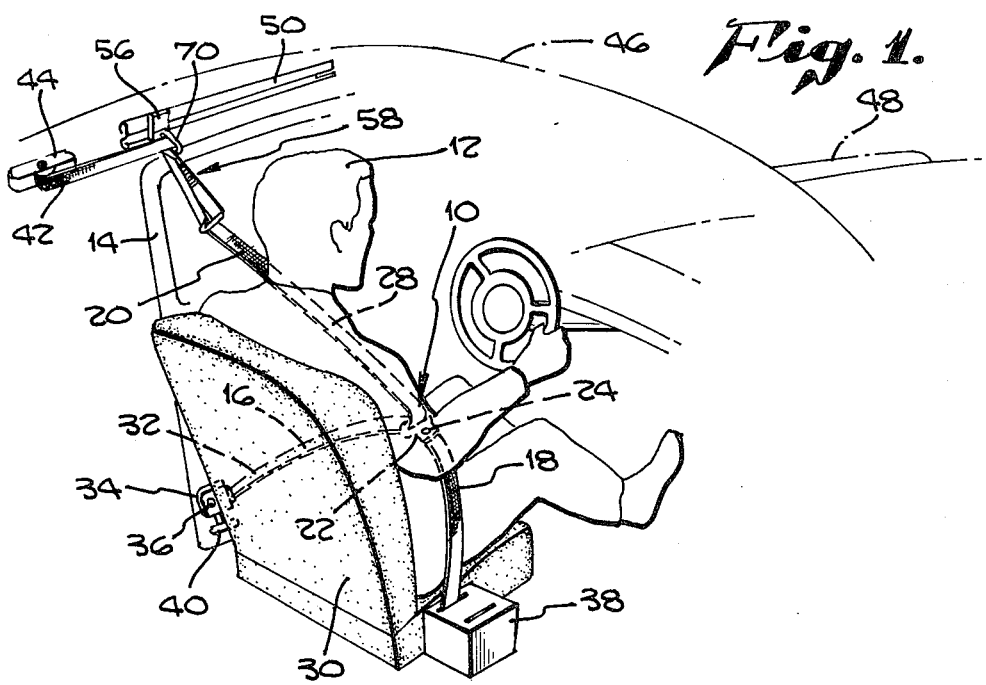
FIG. 1 is a perspective view showing the preferred three-point passive belt system about a vehicle occupant in the occupant restraint position.
Figure 2:
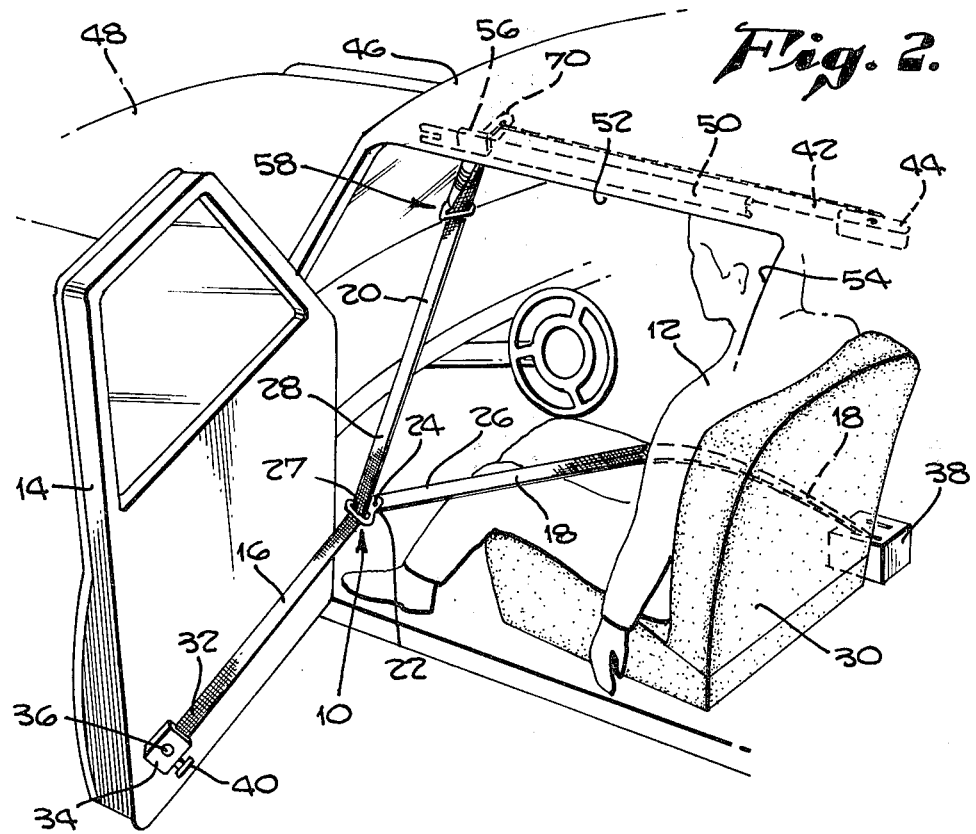
FIG. 2 is a perspective view showing the preferred three-point passive belt restraint system of the present invention in the occupant non-restraint position allowing the occupant to enter or exit the vehicle.

The preferred three-point passive belt restraint system of the present invention is shown generally at 10 in FIGS. 1 and 2. In FIG. 1, the belt system 10 is shown in the occupant restraint position about occupant 12. In FIG. 2, the belt system 10 is shown in the occupant non-restraint or release position. Movement of the belt system 10 between the occupant restraint and non-restraint positions is accomplished by the opening and closing of vehicle door 14.

The belt system 10 can conveniently be broken down into three different segments. The first segment being lower seat belt segment 16. The second being lower seat belt segment 18 and the third being upper shoulder belt segment 20 the three belt segments 16, 18 and 20 are all centrally connected by way of belt connector 22. In the preferred embodiment, the belt connector 22 includes connector body 24 which is securely attached to the outer end 26 of seat belt segment 18. The belt connector 22 further includes a belt passageway 27 through connector body 24. The seat belt segment 16 and shoulder belt segment 20 are preferably made from one integral belt 28. This belt 28 is passed through belt passage way 27 thereby allowing the belt connector 22 to slide along the belt as the belt system 10 is moved between occupant restraint and non-restraint positions. The seat belt segment 16 is the portion of belt 28 which is below belt connector 22. The shoulder belt segment 20 is that portion of integral belt 28 which is above belt connector 22. As will be realized, the lengths of seat belt segment 16 and shoulder belt segment 20 will vary as the belt connector 22 slides along the length of belt 28. Alternatively, the two bottom seat belt segments could be combined into one integral belt which is passed through a belt connector mounted on a separate shoulder belt.

The seat belt segment 16 is located on the outer side of occupant 12 and occupant seat 30. Seat belt segment 16 is attached at its lower end 32 to the vehicle door 14 by a suitable mounting plate 34 which in turn is securely bolted by bolt 36 to door 14. The lower seat belt segment 18 is located on the inner side of occupant 12 and occupant seat 30. The seat belt segment 18 is securely attached to the vehicle by way of a suitable seat belt retractor 38. Seat belt retractor 38 can be any suitable belt retractor commonly used for restraining purposes.

As with other three-point passive belt systems, an emergency safety release 40 is provided for removing the belt system 10 from its restraint position about the passenger in situations where the vehicle door 14 cannot be opened. This allows removal of the occupant 12 from the vehicle following severe accidents wherein the vehicle door 14 is jammed or otherwise unopenable.

The shoulder belt segment 20 is attached at its upper end 42 a suitable shoulder belt retractor 44. The shoulder belt retractor 44, like seat belt retractor 38, may be any of the well known belt retractors commonly in use. As door 14 is opened, retractors 44 and 38 allow unwinding of belts 18 and 28. As door 14 is closed, the retractors 44 and 38 rewind belts 28 and 18 thereby taking up slack to position the belt system 10 in place about occupant 12. In order to insure that shoulder belt 20 is completely moved out of the vehicle occupant's way as entry to or exit from the vehicle is made, the shoulder belt 20 is moved forward along the inside of roof 46 of vehicle 48. A track 50 is provided just above the top 52 of vehicle doorway 54. A sled 56 is mounted slideably within the track 50. In prior art devices, the sled 56 included a web guide ring through which the shoulder belt segment 20 was passed. As the sled 56 was moved forward in track 50, the shoulder belt segment would also be pulled forward by the web guide ring. In accordance with the present invention however, a flexible belt positioning arm 58 is attached to sled 56 to replace the prior art belt guide ring. The following will be a detailed discussion of the preferred flexible belt positioning arm of the present invention.

Referring now to FIGS. 3, 4 and 5, the preferred flexible belt positioning arm of the present invention is shown generally at 58. The preferred flexible positioning arm includes an upper tube arm 60 and a lower tube arm 62. As particularly contemplated by the present invention, flexible connection means such as main spring element 64 is provided for flexibly connecting the upper tube arm 60 to the lower tube arm 62. The spring element 64 can be made from any suitable spring steel or other material commonly used for making flexible spring connections. Preferrably, the spring element 64 should be flexible enough to bend if it contacts the occupants shoulder or other bodily surface either inadvertently or during crash conditions to prevent injury to the occupant. The spring element 64 should be stiff enough to guide the belt 28 forward without undue bending, but flexible enough to prevent injury as discussed above. Of course, the flexible connection could be deleted if desired to provide a stiff positioning arm; however, for the above discussed safety reasons, a flexible positioning arm is preferred.

The lower tube arm, at its lower end 66, has a lower web guide or positioner 68 attached thereto. The web guide 68 guides and positions the shoulder belt segment 20 of belt 28 when the belt system 10 is moved between occupant restraint and non-restraint positions. An upper web guide 70 is attached to the crimped end 72 of upper tube arm 60. The upper web guide 70 guides the belt 28 into alignment for winding and unwinding to retractor 44. The upper web guide 70 is attached to a mounting plate 74 by welding or other suitable mounting means. The mounting plate 74 is in turn bolted, riveted or otherwise securely attached to crimped end 72. Preferably, rivets 76 are utilized to attach the mounting plate 74 to upper tube bar crimped end 72. The lower web guide 68 is also conveniently mounted to a mounting plate 78, the mounting plate 78 being mounted to the lower tube arm lower end 66 as described below.

Means for mounting the upper tube arm 60 to sled 56 are also preferably provided by the rivets 76 which not only pass through mounting plate 74 and crimped end 72, but also pass through sled 56 to thereby securely attach all three pieces together. The upper tube arm 60 is mounted to sled 56 so that when the sled is moved fully rearward along track 50, the lower web guide 68 guides and positions the shoulder belt segment 20 directly adjacent the occupant's shoulder as best shown in FIG. 1. It is important that the belt be positioned adjacent the shoulder by the web guide 68 in an orientation to permit removal of the belt without hitting the occupants chin or head while still being close enough to the shoulder area for proper positioning. In this position, the shoulder belt segment 20 is conveniently placed in a proper position for restraining the occupant 12 in the event of severe changes in inertia. Since the positioning arm 58 is flexible, the arm 58 will flex automatically to accommodate occupants of varying sizes. As will be realized, having the shoulder belt segment 20 positioned directly adjacent the occupant's shoulder provides for a safe and sure placement of the shoulder belt segment 20 during extreme inertia changes experienced during automobile accidents. This is a marked advantage over prior art devices where the shoulder belt segment is not positioned directly adjacent the occupant's shoulder thereby presenting the possibility that the shoulder belt will not be in proper position for restraining the passenger during crash conditions.

Referring to FIG. 7, a detailed sectional view of the flexible positioning arm 58 is shown. The main spring element 64 is attached to upper tube arm 60 by press fitting within mounting sleeve 80. Likewise, the main spring element 64 is mounted to lower tube arm 62 by way of press fitting within mounting sleeve 82. Of course, other means for securing the main spring element 64 to the tube arms 60 and 62 may be utilized.

As particularly contemplated by the present invention, tension means such as tension spring 84 is provided for varying the flexibility of the main spring element 64. The tension spring 84 includes an upper end 86 having a hook 88. The tension spring 86 is passed through mounting hole 90 in the upper tube arm 60 with hook 88 securing the tension spring 84 thereto. The lower end 92 of tension spring 84 also includes a hook 94. The hook 94 is attached to spring anchor 96 which in turn is securely attached to tension spring adjustment means, such as, adjustment plug 98. The adjustment plug 98 includes screw threads 100 about its exterior surface for mating with screw threads 102 on the interior surface of the upper tube arm 60. Further, the adjustment plug 98 includes, on the side opposite the spring anchor 96, a tool coupling, such as slot 104. The slot 104 is of suitable size to receive a standard bladed screwdriver. To adjust the tension in tension spring 84, the adjustment plug 98 is either screwed in or screwed out as desired. Preferably, spring anchor 96 is swivel mounted on the adjustment plug 98 to allow rotation of the adjustment plug 98 without rotating the tension spring 84.

A cap bolt 106 is provided for plugging the outer end of the lower tube arm 62. The cap bolt 106 is threaded so that it may be removed when adjustment of the tension in tension spring 84 is desired. The mounting plate 78 is suitable bolted to the cap bolt 106 by bolt 108. A cover piece 110 is provided to cover the mounting bolt 108. Preferably, the cover piece is made from plastic or other soft yet relatively tough material. Of course, if desired, the entire cap bolt 106, mounting bolt 108 and mounting plate 78 assembly could be incorporated into one integral piece. However, the assembly as shown is preferred.

As shown in FIG. 6, the sled 56 is mounted to track 50 by way of bushings 112 and 114. The bushings are preferably made from smooth plastic or other suitable low resistance material to allow easy sliding of sled 56 along track 50. Further, spacer block 116 is also provided for positioning the sled 56 relative the track 50. In the preferred embodiment, the sled 56 is moved forward along track 50 as a result of the forward force exerted on belt 28 as door 14 is opened. As door 14 is closed, retractor 44 rewinds the belt 28 thereby pulling the sled 56 back to its fully rearward position along track 50. Alternatively, the sled 56 may be pulled forward along track 50 by motorized means. Such motorized means for pulling the sled 56 forward are well known and include systems where the windshield wiper motor or other suitable motor is actuated upon door opening to pull the sled 56 forward.

Having thus described an exemplary embodiment of the present invention, it should be noted by those skilled in the art that the within disclosures are exemplary only and that various alternatives, adaptations and modifications may be made within the scope of the present invention. Thus, by way of example and not of limitation, if desired the adjusting plug 98 for adjusting the tension spring 84 may be suitable placed in the upper tube arm 60 rather than in the lower tube arm 62. Also, a flexible connection other than main spring element 64 may be utilized to provide the flexibility necessary in accordance with the present invention. Accordingly, the present invention is not limited to the specific embodiments as illustrated herein.

What is claimed is:

1. A flexible belt positioning arm adapted for use in a three point passive belt restraint system having two lower seat belt segments and an upper shoulder belt segment, the belt segments being movable between occupant restraint and non-restraint positions, the flexible belt positioning arm being adapted for positioning said upper shoulder belt segment about an occupant in a vehicle, the flexible belt positioning arm comprising:
    a flexible tube arm wherein said tube arm includes an upper tube arm and a lower tube arm and a flexible connection means for flexibly connecting said upper tube arm to said lower tube arm;
    a lower web guide or positioner associated with said tube arm for guiding and positioning said shoulder belt segment passed therethrough; and
    means for mounting said flexible tube arm to said vehicle to place said lower web guide where it will position said shoulder belt segment adjacent the vehicle passengers shoulder when said restraint system is in the passenger restraint position.

2. A flexible belt positioning arm according to claim 1 wherein said flexible connection means includes a main spring element having a first end secured to said lower tube body and a second end secured to said upper tube body.

3. A flexible belt positioning arm according to claim 2 wherein said flexible connection means further includes tension means for varying the flexibility of said main spring element.

4. A flexible belt positioning arm according to claim 1 wherein said flexible connection means is made from a resilient material.

5. A flexible belt positioning arm according to claim 4 wherein the three point passive belt restraint system includes anchor means for anchoring the top end of said shoulder belt segment to said vehicle said flexible belt positioning arm further including an upper web guide associated with said upper tube arm for guiding said shoulder belt segment to said anchor means.

6. A flexible belt positioning arm according to claim 5 wherein said means for mounting said upper tube arm to said vehicle includes a mounting sled for mounting said upper tube arm and a track secured to said vehicle and extending forward and aft, whereby said mounting sled is moved forward to said non-restraint position and moved aft to said restraint position.

7. A flexible belt position arm according to claim 6 in which said shoulder belt retractor continually exerts rewind bias on said shoulder belt segment wherein means for moving said sled forward against said shoulder belt rewind bias is provided to move said sled forward to said non-restraint position in response to external actuation.

8. A flexible belt positioning arm according to claim 7 wherein said shoulder belt segment has its lower end integrally connected to the upper end of a first of said seat belt segments, said first seat belt segment having its lower end secured to the vehicle door.

9. A flexible belt positioning arm according to claim 8 wherein a second of said seat belt segments has its lower end secured by a belt retractor to said vehicle and its upper end slidably secured to said integral shoulder belt and first seat belt segments.

10. In a three point passive restraint system having two lower seat belt segments and an upper shoulder belt segment for restraining an occupant in a vehicle wherein the improvement comprises:
a flexible positioning arm for positioning said shoulder belt segment adjacent the occupants shoulder wherein said flexible belt positioning arm includes an upper tube arm and a lower tube arm with flexible connection means for flexibly connecting said lower tube arm to said upper tube arm, said flexible belt positioning arm also including a lower web guide associated with said lower tube arm for guiding said upper shoulder belt segment passed therethrough.

11. An improved restraint system according to claim 10 wherein means are provided for slidably mounting said flexible positioning arm to provide movement of said arm between an occupant restraint position adjacent the occupant shoulder and an occupant non-restraint position displaced away from the occupants shoulder.

12. An improved restraint system according to claim 10 wherein the flexibility of said flexible connection means is adjustable.

13. An improved restraint system according to claim 11 wherein said lower web guide positions said shoulder belt adjacent said occupants shoulder without said web guide being so close to said occupants head so as to strike the occupants head as the web guide is moved to the occupant non-restraint position.

* * * * *